Dec. 5, 1939.  C. STANSBURY  2,182,241
CIRCUIT CONTROLLER
Filed July 21, 1937
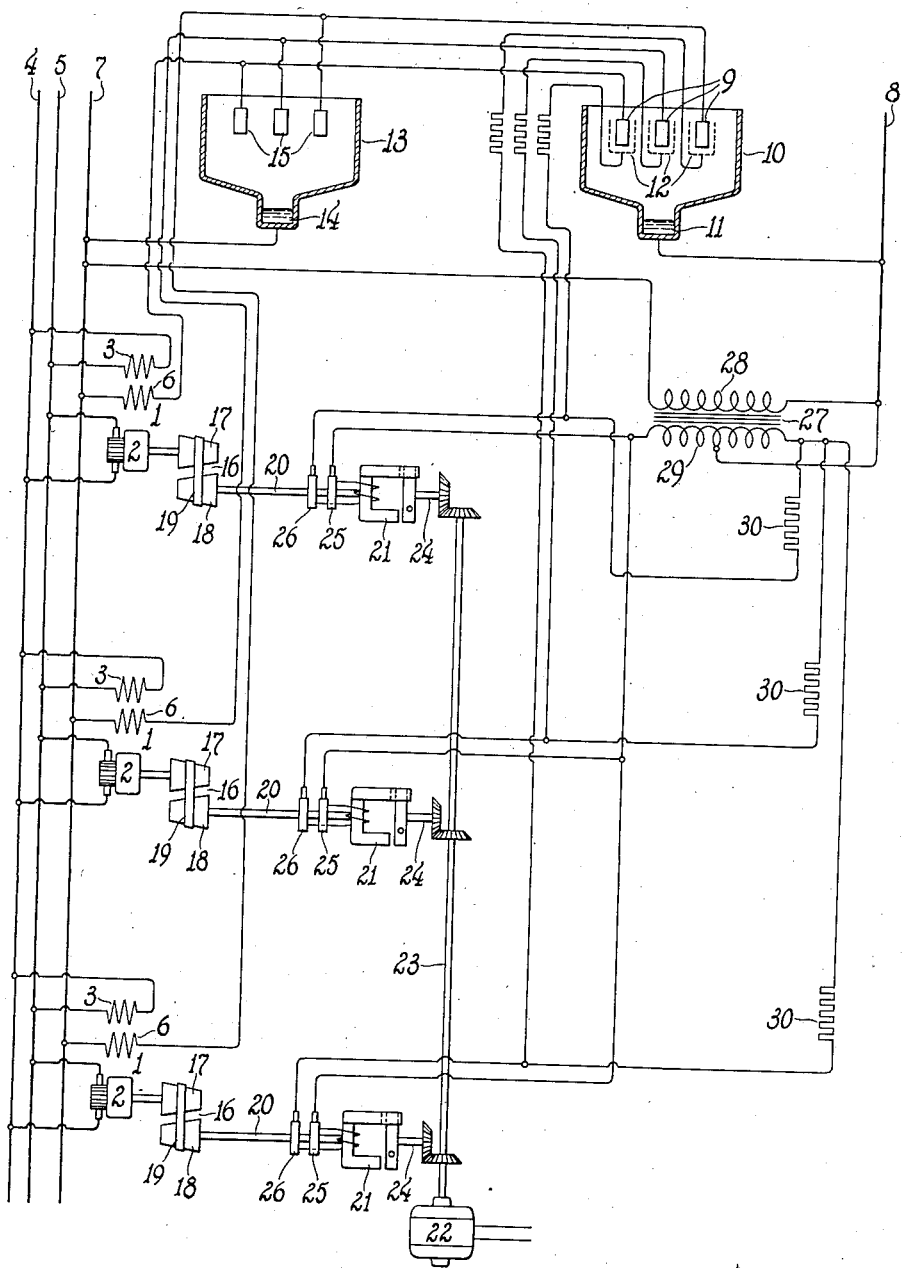
Inventor
Carroll Stansbury
By
Attorney Patented Dec. 5, 1939

2,182,241

UNITED STATES PATENT OFFICE 2,182,241

CIRCUIT CONTROLLER

Carroll Stansbury, Wauwatosa, Wis., assignor to Cutler-Hammer, Inc., Milwaukee, Wis., a corporation of Delaware Application July 21, 1937, Serial No. 154,743

5 Claims. (Cl. 172—293)

This invention relates to control systems employing electronic means for controlling a plurality of translating devices individually.

Heretofore where individual control of a number of translating devices by electronic means has been desired, separate control tubes for the several devices have been required and the present invention has among its objects to afford control of the devices individually through the medium of a unitary electronic device, with simplification of the system and material reduction in cost thereof.

Another object is to provide such a system affording individual control of a number of translating devices which is suited to the control of a number of devices requiring joint control as well as individual control.

Another object is to provide a system wherein a number of translating devices may be supplied with a controlled unidirectional current from an alternating current circuit through a unitary rectifier and including means to maintain the current flow through the devices during the half periods when the respective anodes are non-conducting.

Other objects and advantages will hereinafter appear.

The system comprises an alternating current supply source and a plurality of translating devices. Each translating device is connected with one terminal to one pole of the supply, while the other terminal is connected to an anode of a grid-controlled multi-anode rectifier, the common cathode of which is connected to the other pole of the supply. By controlling the individual grid voltages, the moment when current begins to pass through the translating device during the positive half cycle of the alternating current and thus the effective current in the translating device can be controlled individually. A multi-anode rectifier without grid control has its cathode connected to the first mentioned pole of the supply, while its anodes are respectively connected to the anodes of the control rectifier. Thus the second rectifier permits current flow resulting from the energy stored in the translating devices to continue during the negative half periods of the alternating cycle.

By way of example the invention will be explained in connection with a paper machine drive such as generally disclosed in my Patent No. 2,025,315, issued December 24, 1935. In the accompanying drawing the single figure is a diagrammatic representation of a multi-motor sectional paper machine drive incorporating the invention.

The system illustrated comprises individual driving motors for each section of a paper machine and designated generally by the numeral 1 and as many motors may be employed as required. Each motor has an armature 2 and a field winding 3 which are supplied from a source of direct current represented by the bus lines 4 and 5. The motors also have a regulating field winding 6 by means of which their speed can be adjusted. One end of the field windings 6 is connected to one bus 7 of an alternating current supply whose other bus is indicated at 8. The other ends of the field windings 6 are each connected to one of a number of anodes 9 of a grid-controlled rectifier 10, whose cathode 11 is connected to the bus 8. The rectifier 10 is also provided with grids 12, one for each anode. A second rectifier 13 has its cathode 14 connected to bus 7, while one each of its anodes 15 is connected to a corresponding anode 9.

The motor armatures 2 are provided with a drive 16 which by means of cam pulleys 17 and 18 and a belt 19 drive a shaft 20 at an adjustable speed in a well known manner. The shaft 20 is coupled to one element of a variable reactance device 21 such as shown in detail in my aforementioned patent. Briefly, the device 21 consists of a magnetizable U-shaped frame on which is mounted a winding whose two ends are connected to the slip ring 25 and 26, respectively. The frame is mounted on the shaft 20. An armature is mounted on the shaft 24. As the shaft 24 changes its angular position with respect to shaft 20, the armature changes its angular position relative to the frame and thereby causes variations of the impedance of the winding. A control motor 22 whose speed may be varied in any well known manner drives, through a shaft 23 and bevel gears, a second shaft 24 of the reactances 21. Normally the speeds of the shafts 20 and 24 are alike and the value of the reactance 21 depends upon the relative angular position of the shafts. If this position varies, the reactance increases or decreases in accordance therewith. The winding of the reactance 20 is connected between two slip rings 25 and 26.

A transformer 27 has its primary winding 28 connected across the busses 7 and 8, while the center tap of its secondary winding 29 is connected to the bus 8. One end terminal of winding 29 is connected to the slip rings 25, the other end terminal being each connected through limiting resistances 30 to one of the grids 12 and one of the slip rings 26.

The operation of the system is as follows: When the lines 4 and 5 are energized, current is supplied to the motor armatures 2 and fields 3 and the motors revolve. If the lines 7 and 8 are also energized a current may flow during alternate half cycles from bus 7 through the fields 6, over anodes 9, cathode 11 to bus 8, provided the potential of grids 12 becomes less negative than the critical grid voltage. If after current flow has been established during a positive half cycle, the voltage at the anodes 9 passes again through zero, current may yet continue to flow as a result of the inductance of windings 6 through said windings, over the respective anodes 15 and cathode 14 back to the winding 6.

As aforestated, the moment when current commences to pass over the anodes 9 and cathode 11 depends upon the value of the grid voltage. The voltage which winding 29 impresses on the grid is sufficiently negative during the positive half cycle to prevent any conduction through rectifier 10. However, depending upon the value of the impedance 21, which varies with the angular position of the shafts 20 and 24, the voltage of the impedance is geometrically combined with the transformer voltage and the ohmic drop in the circuit so that the resultant grid voltage may become less negative than the critical voltage and cause the respective anode to start conducting current at a corresponding moment of the positive half cycle each anode acting independently of the others.

The motor 22 has its speed adjusted to a given value, which bears the required ratio to the speed of the motors 1. By adjusting the cone pulleys 17 and 18 the speed of the shafts 20 is made equal to that of shafts 24 for any desired speed of the motors 1. Thus the speed of the motors 1 relative to each other may be adjusted to a given value. If now the speed ratio of any motor with respect to the speed of motor 22 tends to vary, the shafts 20 and 24 rotate relative to each other, thereby varying impedance 21, which varies the grid voltage thereby varying the moment of initiation of current flow to the fields 6 and thus varying the effective current in the fields. This causes the speed of the respective motor 1 to be corrected to the desired value. If it is desired to change the speed of all of the motors without changing their speed ratio, the speed of motor 22 is varied accordingly.

While I have shown the invention as applied to the control of a plurality of motors, the relative speed of which is to be maintained at desired ratios, and where such speed is controlled by controlling a field winding of the motors, it is obvious that the system may also be applied to another circuit of the motors such as the armature circuit. It is further obvious that the characteristic of a plurality of other types of translating devices, such as lamp circuits, may be controlled in a similar manner, all of such modifications coming within the scope of the present invention and the appended claims.

What I claim as new and desire to secure by Letters Patent is:

1. In combination, a plurality of impedances, a source of alternating current, means to supply said impedances with unidirectional energy from said source, said means comprising an electronic tube having a plurality of anodes respectively connected to said impedances, a cathode common to said anodes and connected to one terminal of said source, a plurality of grids, one for each of said anodes, an unidirectionally conducting discharge device including a plurality of anodes each connected to one of said first mentioned anodes and a cathode connected to another terminal of said source, means to control the voltage of said grids individually to afford control of said impedances individually and means to superimpose a joint voltage control upon said individual controls to thereby superimpose a joint control of said impedances upon said individual control thereof.

2. In combination, a plurality of impedances, a source of alternating current, means to supply said impedances with unidirectional energy from said source, said means comprising an electronic tube having a plurality of anodes respectively connected to said impedances, a cathode common to said anodes and connected to one terminal of said source, a plurality of grids, one for each of said anodes, an unidirectionally conducting discharge device including a plurality of anodes each connected to one of said first mentioned anodes and a cathode connected to another terminal of said source and means to control the energy of said grids individually in response to an operating characteristic of the respective impedance to afford control thereof individually and means to superimpose a joint voltage control upon said individual grid control to thereby superimpose a joint control of said impedances upon said individual control thereof.

3. In combination, a plurality of translating devices, a source of alternating current, a control circuit for each of said translating devices, means to supply said control circuits with power from said source, said means comprising an electronic tube having a plurality of anodes respectively connected to said control circuits, a cathode common to said anodes and connected to one terminal of said source, a plurality of grids one for each of said anodes, an unidirectionally conducting discharge device including a plurality of anodes each connected to one of said first mentioned anodes and a cathode connected to another terminal of said source, means to control the voltage of said grids individually to afford control of said translating devices individually and means to superimpose a joint voltage control upon said individual control to thereby superimpose a joint control of said translating devices upon said individual control thereof.

4. In combination, a plurality of motors each having a control winding, a source of alternating current, means to supply said control windings with unidirectional energy from said source, said means comprising an electronic tube having a plurality of anodes, one for each winding and connected in circuit therewith, a cathode common to said anodes and connected to one terminal of said source, a plurality of grids, one for each of said anodes, an unidirectionally conducting discharge device, including a plurality of anodes each connected to one of said first mentioned anodes and a cathode connected to another terminal of said source, means to control the voltage of said grids individually to afford control of said motors individually and means to superimpose a joint voltage control upon said individual controls to thereby superimpose a joint control of said motors upon said individual control thereof.

5. In combination, a plurality of motors each having a control winding, a source of alternating current, means to supply said control windings with unidirectional energy from said source, said means comprising an electronic tube having a plurality of anodes, one for each winding and connected in circuit therewith, a cathode common to said anodes and connected to one terminal of said source, a plurality of grids, one for each of said anodes, an unidirectionally conducting discharge device, including a plurality of anodes respectively connected to said first mentioned anodes and a cathode connected to another terminal of said source and means to control the energy of said grids individually in response to an operating characteristic of the respective motor to afford control thereof individually and means to superimpose a joint voltage control upon said individual grid control to thereby superimpose a joint control of said motors upon said individual control thereof.

CARROLL STANSBURY.